United States Patent [19]

Wu

[11] Patent Number: 5,029,786
[45] Date of Patent: Jul. 9, 1991

[54] SUCTION CUP

[76] Inventor: Hans Wu, No. 78, Chung-Shan Wu St., Tainan City, Taiwan

[21] Appl. No.: 525,988

[22] Filed: May 21, 1990

[51] Int. Cl.$^5$ .............................................. A47F 5/00
[52] U.S. Cl. .................................................. 248/205.7
[58] Field of Search ............... 248/205.3, 205.6, 205.7, 248/205.8, 205.9, 206.1, 206.2, 206.3, 309.3, 362

[56] References Cited

U.S. PATENT DOCUMENTS

| 1,532,308 | 4/1925 | Downing | 248/205.5 |
| 2,221,238 | 11/1940 | Johnson | 248/362 X |
| 4,093,165 | 6/1978 | Sussman | 248/205.5 X |
| 4,580,751 | 4/1986 | Panzer | 248/205.8 |
| 4,607,875 | 8/1986 | McGirr | 248/205.5 X |
| 4,813,640 | 3/1989 | Perentin | 248/205.8 |

FOREIGN PATENT DOCUMENTS

| 0475317 | 4/1929 | Fed. Rep. of Germany | 248/205.5 |
| 1560077 | 3/1969 | France | 248/205.8 |
| 0683290 | 11/1952 | United Kingdom | 248/205.5 |
| 1193899 | 6/1970 | United Kingdom | 248/205.7 |

Primary Examiner—Ramon O. Ramirez
Attorney, Agent, or Firm—Harness, Dickey & Pierce

[57] ABSTRACT

A suction cup includes a suction pad which is made of elastic material, and has a peripheral edge and shaped like a bell with a convex face, a lug portion constructed on the convex face and a flat flange portion extending from the peripheral edge. A frame made of elastic material, having a fastening portion and a pressing portion, the fastening portion is attached to the lug portion of the suction pad and the pressing portion attached to flat flange portion of the same. The suction cup further has a strong suction strength and a simple construction.

4 Claims, 4 Drawing Sheets

SUCTION CUP

BACKGROUND OF THE INVENTION

The invention relates to a suction cup, more particularly to a suction cup that has a strong suction strength with a simple construction.

FIGS. 1, 2, and 3 explain the prior art of the invention. Referring to FIG.1, a suction cup includes a suction pad 1 mostly made of latex and substantially shaped as a bell with a convex face 14 and a peripheral edge 11 and having a lug portion 12 constructed on said convex face 14. It is used by simply pressing it on a smooth surface or a wall (B). The suction pad 1 will push the air outward creating a vacuum 13 between the wall (B) and the suction pad 1. When the applied pressure ceases the suction pad will retain its normal shape due to the flexibility of its constructing material, thus causing the suction pad to stick to the wall (B).

Referring to FIGS. 2 and 3, a suction cup includes a suction pad 21 having a peripheral edge 211 and shaped like a bell, and having a lug portion 212 with a through-hole therein; a rigid frame 22 also shaped like a bell, having a pressing portion 221 and a fastening portion 227, said fastening portion 227 having a pair of upward protrusions 222 and 223 each with a through-hole 224,225 formed thereon, said through-hole 225 being bigger than said through-hole 224; an insertion member 23 having an insertion piece 24 and a protrusion 231.

The rigid frame 22 can be fitted on the suction pad 21 so that the pressing portion 221 is attached to the peripheral edge 211 and the fastening portion 227 is engaged with the lug portion 212. The insertion member 23 is inserted through through-holes 225, 213 and 224 to lock in said frame 22 and said suction pad 21 together. To use the suction cup one need only to turn the insertion member 23 s that the protrusion 231 will press down the lug portion 212, expelling the air D within the suction pad 21 and the wall, creating a vacuum. Then the suction cup will retain its normal shape as a result of the flexibility of the memory of the materials of which its constructed so that the suction cup will stick to the wall. (shown in FIG. 3 by perforated lines)

According to first embodiment of the suction cup, its shape is easily changeable and it does not possess strong suction strength. The construction of the second embodiment of the suction cup is a bit complicated. Therefore, to solve the above drawbacks, a new suction cup has been invention.

SUMMARY OF THE INVENTION

The object of the present invention is to provide a suction cup that has a strong suction strength.

Another object of the present invention is to provide a suction cup with a simple construction.

Still another object of the present invention is reduction of the manufacturing cost of a suction cup.

Accordingly, the present invention provides a suction cup including a suction pad which is made of elastic material and substantially shaped like a bell with a convex face and a peripheral edge, and having a lug portion constructed on the convex face and a flat flange portion extending from the peripheral edge; a frame which is also made of elastic material, having a fastening portion attached to the lug portion of the suction pad and a pressing portion attached to the flat flange of the same, and elastic means connecting the fastening portion and the pressing portion.

BRIEF DESCRIPTION OF THE DRAWINGS

The present invention will be more apparent and understood with the accompanying drawings, in which.

DETAILED DESCRIPTION OF THE PREFERRED EMBODIMENT

Figure 2:
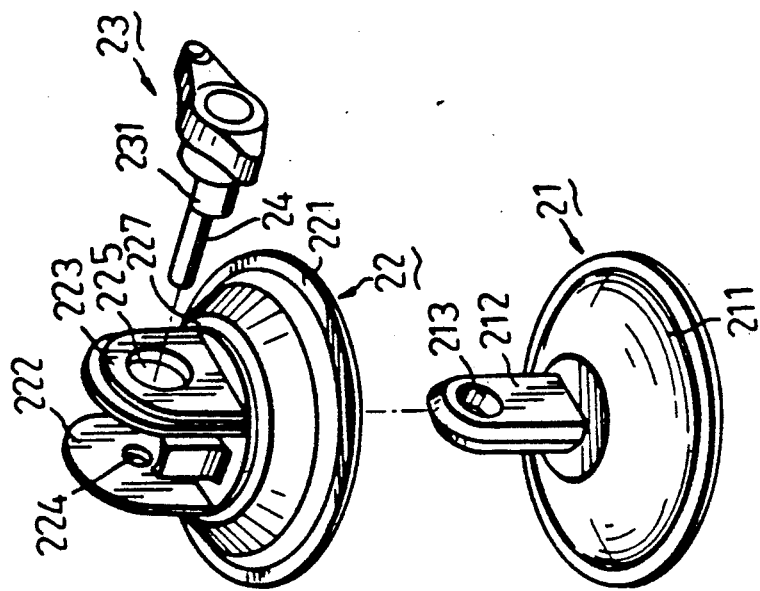
FIG. 2 is an exploded view of another suction cup of prior art.
Figure 1:
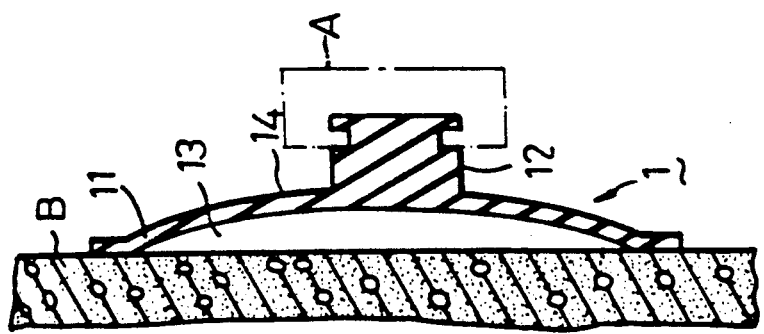
FIG. 1 is schematic view of a suction cup of prior art in an operating position.
Figure 4:
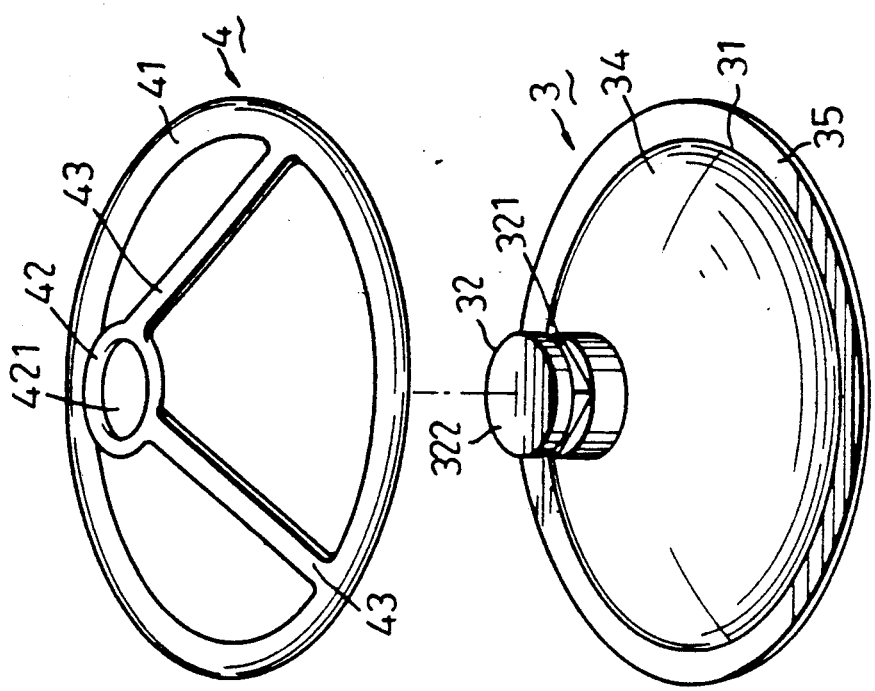
FIG. 4 is an exploded view of a first preferred embodiment of the present invention.
Figure 3:
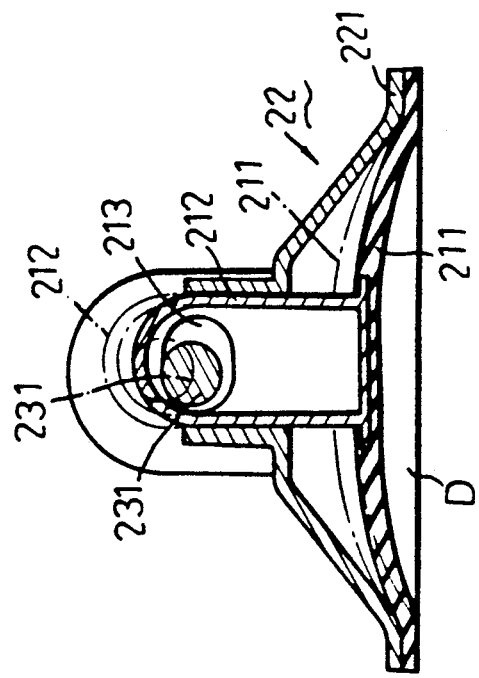
FIG. 3 is a cross sectional view of the suction cup illustrated in FIG. 2.

Referring to FIG. 4, a suction cup includes a suction pad 3 having a peripheral edge 31 with a convex face 34 and a flat flange 35 extending from the peripheral edge 31, and a lug portion 32 constructed on the convex face 34 of the suction pad 3, said lug portion 32 having a groove formed around it; a frame 4 also made of elastic material having a ring shaped fastening portion 42 with a hole 421 attached to the groove 321 of lug portion 32, and a pressing portion 41 attached on the flat flange portion 35 of the suction pad 3. The fastening portion 42 and the pressing portion 41 is connected by a plurality of elastic means 43.

Figure 5:
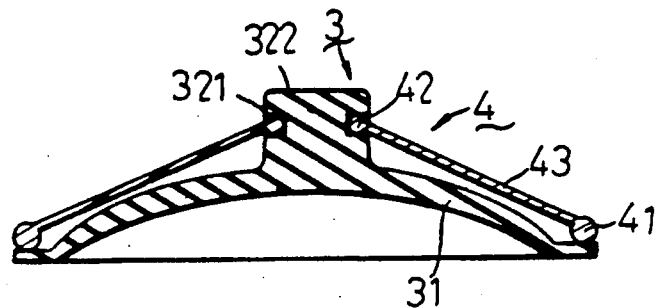
FIG. 5 is a cross sectional view of the first preferred embodiment of the present invention.
Figure 6:
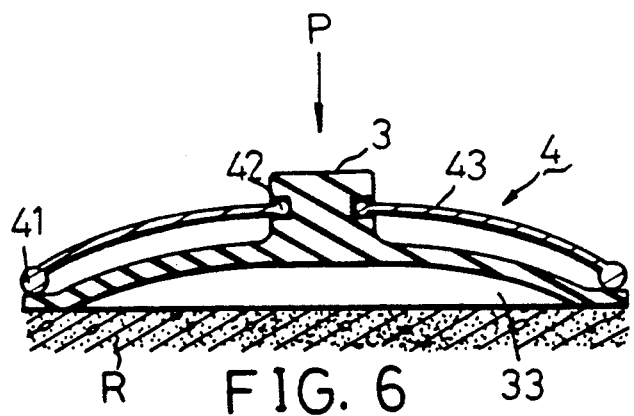
FIG. 6 is a cross sectional view of the first preferred embodiment of the present invention in an operating position.

Referring to FIGS. 5 and 6, when the frame 4 is fitted on the suction pad 3, the fastening portion 42 will engage the groove 321, even though the diameter of the fastening portion 42 is smaller than that of lug portion 32, because of the flexibility of fastening portion which made of an elastic substance. When pressure P is imparted to on the lug portion 3, the elastic means will bend and push the air outward from between the wall R and suction pad 31 thus causing a vacuum 33. When the pressure is removed, the suction cup will retain its normal shape as a result of the memory of its flexible construction material, so that the suction cup will firmly stick to the wall R .

Figure 7:
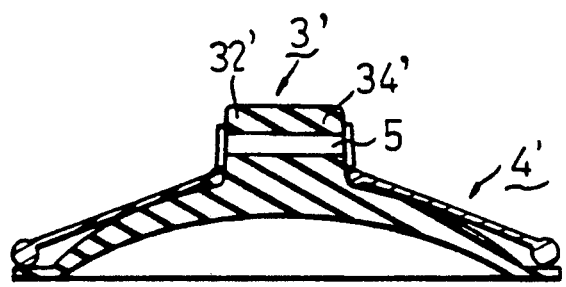
FIG. 7 is a cross sectional view of a second preferred embodiment of the present invention.

Referring to FIG. 7 whereas there is no groove formed around the lug portion 3', but the fastening portion is engaged with the lug portion 3' and locked by an insertion piece 5 through a through-hole 34' disposed radially in the lug portion 3'.

Figure 9:
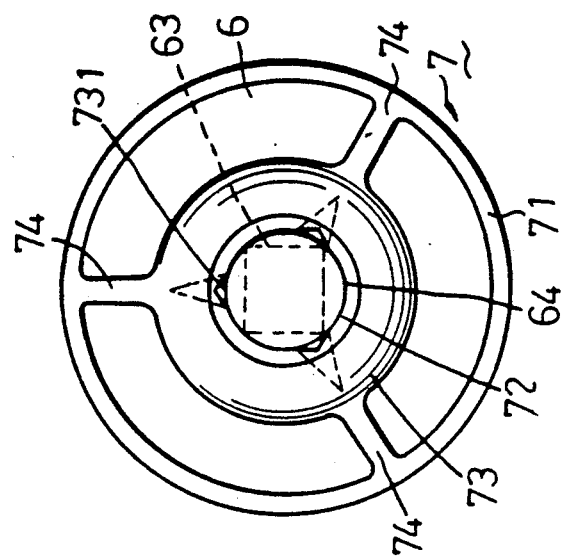
FIG. 9 is a top view of the third preferred embodiment of the present invention in an operating position.
Figure 8:
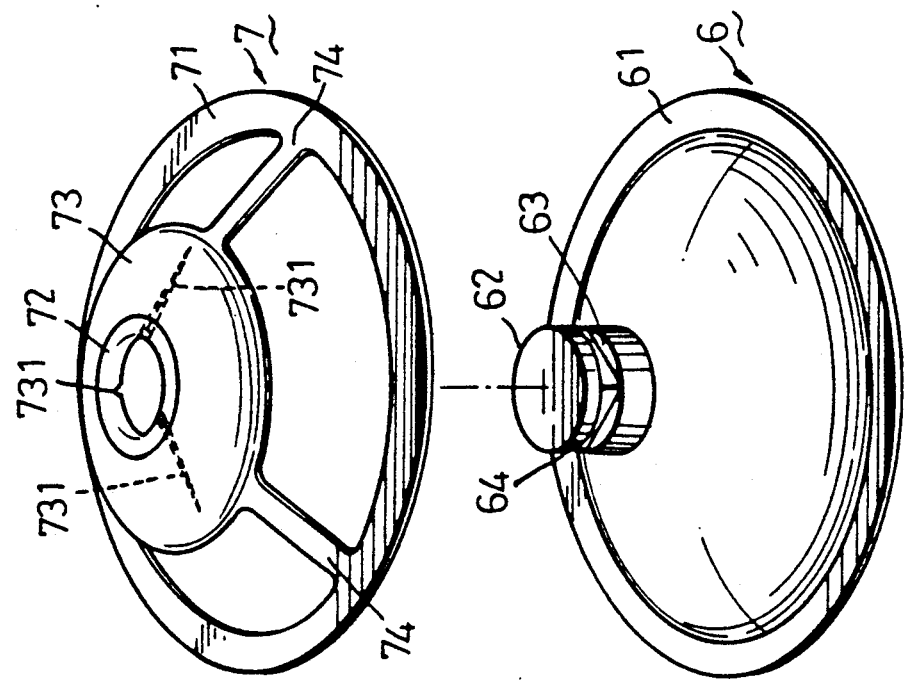
FIG. 8 is an exploded view of a third preferred embodiment of the present invention.

Referring to FIGS. 8 and 9, wherein the suction pad 6 is the same as that of first preferred embodiment as explained in FIG. 4. The fastening portion 72 and pressing portion 71 of the frame 7 are connected by a plurality of elastic means, said elastic means further comprising an arc plate 73 integrally formed around the fastening portion 72, said arc plate having a plurality of slit 731 formed therein. When the fastening portion 72 is fitted on through the lug portion 62 to attached to the groove 63, the slit 731 of the arc plate 73 will allow some flexibility because the diameter of fastening portion is smaller than that of lug portion. According to the present invention the elastic means 74 of the frame 7 have stronger elasticity bigger than that of suction pad 6 so that the suction cup has a stronger suction strength.

With the invention thus explained, it is obvious to those skilled in the art that various modifications and variations can be made without departing from the scope and the spirit of this invention.

I claim:

1. A suction cup comprising:
   a suction pad which is made of elastic material and substantially shaped as a bell with a convex face and a peripheral edge, a lug portion constructed on said convex face and a flat flange portion extending from said peripheral edge, said lug portion of said suction pad being shaped as a post having a groove formed therearound; and
   a frame which is also made of elastic material, said frame having a ring-shaped fastening portion, said fastening portion being received within said groove to attach said frame to said lug portion of said suction pad, a pressing portion attached on said flat flange portion of said suction pad, and elastic means comprising an arc plate integrally formed around said fastening portion and a plurality of ribs respectively connected and elastically bent between said arc plate and said pressing portion and at least one slit is formed, extendedly from said fastening portion to said arc plate.

2. A suction cup as claimed in claim 1, wherein said elastic means of said frame have stronger elasticity than that of said suction pad.

3. A suction cup comprising:
   a suction pad which is made of elastic material and substantially shaped as a bell with a convex face and a peripheral edge, a lug portion constructed on said convex face and a flat flange portion extending from said peripheral edge; and
   a frame which is also made of elastic material, said frame having a fastening portion attached to said lug portion and locked by an insertion piece through a through-hole forming radially in said lug portion of said suction pad, a pressing portion attached on said flat flange portion of said suction pad, and elastic means comprising an arc plate integrally formed around said fastening portion and a plurality of ribs respectively connected and elastically bent between said arc plate and said pressing portion between said arc plate and said pressing portion and at least one slit is formed, extendedly from said fastening portion to said arc plate.

4. A suction cup as claimed in claim 3, wherein said elastic means of said frame have stronger elasticity than that of said suction pad.

* * * * *

UNITED STATES PATENT AND TRADEMARK OFFICE
CERTIFICATE OF CORRECTION

PATENT NO. : 5,029,786

DATED : July 9, 1991

INVENTOR(S) : Hans Wu

It is certified that error appears in the above-identified patent and that said Letters Patent is hereby corrected as shown below:

Column 1, line 38, "s" should be --so--.

Column 1, line 43, "its" should be --it is--.

Column 1, line 49, "invention" should be --invented--.

Column 2, line 7, after "is" insert --a--.

Column 2, line 45, after "which" insert --is--.

Column 4, lines 22-23, Claim 3, delete "between said arc plate and said pressing portion".

Signed and Sealed this

Tenth Day of November, 1992

Attest:

DOUGLAS B. COMER

Attesting Officer

Acting Commissioner of Patents and Trademarks